United States Patent
Abdoli et al.

(10) Patent No.: US 10,212,727 B2
(45) Date of Patent: Feb. 19, 2019

(54) CONTROL SIGNALING IN MULTIPLE ACCESS COMMUNICATION SYSTEMS

(71) Applicants: Javad Abdoli, Kanata (CA); Ming Jia, Ottawa (CA)

(72) Inventors: Javad Abdoli, Kanata (CA); Ming Jia, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 307 days.

(21) Appl. No.: 14/928,750

(22) Filed: Oct. 30, 2015

(65) Prior Publication Data

US 2016/0128088 A1 May 5, 2016

Related U.S. Application Data

(60) Provisional application No. 62/073,286, filed on Oct. 31, 2014.

(51) Int. Cl.
*H04W 72/12* (2009.01)
*H04L 5/00* (2006.01)
(Continued)

(52) U.S. Cl.
CPC ....... *H04W 72/1289* (2013.01); *H04L 5/0037* (2013.01); *H04L 5/0053* (2013.01);
(Continued)

(58) Field of Classification Search
CPC .. H04L 5/0037; H04L 5/0053; H04W 72/042; H04W 72/1289; H04W 72/0473
See application file for complete search history.

(56) References Cited

U.S. PATENT DOCUMENTS

2003/0186704 A1* 10/2003 Tamura ............. H04L 29/06027
455/450
2006/0082378 A1* 4/2006 Majerus ................. G01R 27/28
324/756.07
(Continued)

FOREIGN PATENT DOCUMENTS

CN    101562896 A    10/2009
CN    101932096 A    12/2010
(Continued)

OTHER PUBLICATIONS

International Search Report and Written Opinion of PCT/IB2015/058425, dated Jan. 27, 2016, 11 pages.
(Continued)

*Primary Examiner* — Edan Orgad
*Assistant Examiner* — Nourali Mansoury

(57) ABSTRACT

Control signaling in multiple access communication systems, including apparatus and methods, is disclosed. Multiple access to a wireless communication link is based on power modulation division. Modulation information, capacity information, resource scheduling information, and resource assignment information is determined by a base station. Information is transmitted to user equipment devices in a common control channel in accordance with the determined modulation information, capacity information and resource scheduling information. Information is also transmitted to supporting user equipment, which supports the power modulation division multiple access, in a user equipment-specific control channel in accordance with the determined resource assignment information.

23 Claims, 8 Drawing Sheets

(51) Int. Cl.
  *H04W 52/26* (2009.01)
  *H04W 88/08* (2009.01)
  *H04W 72/04* (2009.01)
  *H04W 74/00* (2009.01)

(52) U.S. Cl.
  CPC ........ *H04W 52/262* (2013.01); *H04W 72/042* (2013.01); *H04W 74/00* (2013.01); *H04W 88/08* (2013.01)

(56) References Cited

U.S. PATENT DOCUMENTS

| | | | |
|---|---|---|---|
| 2008/0102878 A1* | 5/2008 | Tiedemann, Jr. | H04W 52/08 455/522 |
| 2012/0182950 A1* | 7/2012 | Chung | H04L 5/0053 370/329 |
| 2012/0320806 A1 | 12/2012 | Ji et al. | |
| 2013/0064216 A1* | 3/2013 | Gao | H04W 72/04 370/330 |
| 2013/0163525 A1* | 6/2013 | Moon | H04W 72/042 370/329 |
| 2013/0286992 A1* | 10/2013 | Hong | H04W 72/0406 370/329 |
| 2014/0044204 A1* | 2/2014 | Li | H04L 27/2646 375/260 |
| 2016/0037460 A1 | 2/2016 | Benjebbour et al. | |

FOREIGN PATENT DOCUMENTS

| | | |
|---|---|---|
| WO | 2012027732 A1 | 3/2012 |
| WO | 2014162819 A1 | 10/2014 |

OTHER PUBLICATIONS

3GPP TSG RAN meeting #65 RP-141165, "Justification for NOMA in New Study on Enhanced MU-MIMO and Network Assisted Interference Cancellation",NTT DOCOMO,Inc.Sep. 9-12, 2014,total 13 pages.

* cited by examiner

CONTROL SIGNALING IN MULTIPLE ACCESS COMMUNICATION SYSTEMS

CROSS-REFERENCE TO RELATED APPLICATION

The present application claims the benefit of U.S. Provisional Application Ser. No. 62/073,286, entitled "Control Signaling In Multiple Access Communication Systems", filed on Oct. 31, 2014, the entire contents of which are incorporated herein by reference.

FIELD

The present disclosure relates generally to communications and, in particular, to control signaling in multiple access communication systems.

BACKGROUND

Control signaling in communication systems is typically specific to particular types of communication systems and control information that is to be distributed.

SUMMARY

Multiple access to a wireless communication link by user equipment is based on power modulation division in embodiments disclosed herein. User equipment is referred to in singular form as a UE or in plural form as user equipment devices or UEs in the present disclosure. Common control information associated with such multiple access could include modulation information, capacity information, and resource information. UE-specific control information could include modulation layer assignment information and resource assignment information.

Control of multiple access at a link level lies with a base station. In an embodiment, a base station for multiple access based on power modulation division communication includes a controller and a transmitter. The controller is implemented using a processor in one embodiment.

The controller is coupled to the transmitter. In a processor-based embodiment, the processor is configured to determine the common control information and the UE-specific control information, to provide information to the transmitter for transmission through a communication interface, which includes an antenna in an embodiment, in a common control channel in accordance with the determined common control information, and to provide information to the transmitter for transmission through the communication interface in a UE-specific control channel in accordance with the determined UE-specific control information.

A method for multiple access based on power modulation division communication, performed at a base station in another embodiment involves determining the common control information and the UE-specific control information, transmitting information to the UEs in a common control channel in accordance with the determined common control information, and transmitting information to at least one of the UEs in a UE-specific control channel in accordance with the determined UE-specific control information.

An embodiment of a UE for multiple access based on power modulation division communication includes a receiver, operatively coupled to a communication interface that includes an antenna in one embodiment. In a processor-based embodiment, the receiver includes a processor. The processor is configured to receive information from a base station in a common control channel in accordance with the common control information and to receive information from the base station in a UE-specific control channel in accordance with the UE-specific control information. The processor is also operative to configure the receiver to independently decode user data for the UE based on the received information.

A communication system could include multiple base stations, any one or more of which could be implemented as discussed above, as well as multiple UEs, including one or more UEs that support multiple access as disclosed herein and are implemented as discussed above.

The base stations in a communication system could thus include a base station that has a transmitter configured to transmit transmissions and a controller, coupled to the transmitter. The controller includes a processor in one embodiment, to: determine modulation information, capacity information, resource scheduling information, and resource assignment information for UEs; provide information to the transmitter for transmission through a communication interface in a common control channel in accordance with the determined modulation information, capacity information and resource scheduling information to the UEs; and provide information to the transmitter for transmission through the communication interface to a UE in a UE-specific control channel in accordance with the determined resource assignment information. The UEs in a communication system could similarly include at least one UE that has a receiver. In an embodiment, the receiver has a processor to: receive information, from the base station in the common control channel in accordance with the modulation information, capacity information, and resource scheduling information; receive information, from the base station in the UE-specific control channel in accordance with the resource assignment information; and configure the receiver to independently decode user data for the UE based on the received information.

Another embodiment relates to a method for multiple access based on power modulation division communication, performed at a UE. Such a method includes receiving information from a base station in a common control channel in accordance with common control information and receiving information from the base station in a UE-specific control channel in accordance with UE-specific control information. A receiver at the UE is configured to independently decode user data for the UE based on the received information.

Both a base station method and a UE method could be performed in a communication system. The base station method could be performed at each of one or more base stations in the communication system, and the UE method could be performed at each of one or more UEs in the communication system.

Such a method for multiple access based on power modulation division communication could involve determining, at a base station in a communication system, modulation information, capacity information, resource information, and resource scheduling information for a plurality of UEs in the communication system. Information is transmitted to the UEs in a common control channel in accordance with the determined modulation information, capacity information, and resource scheduling information, and information is transmitted to at least one of the UEs in a UE-specific control channel in accordance with the determined resource assignment information, in an embodiment. The at least one UE is a supporting UE that supports the power modulation division multiple access. At the UEs, information is received from the base station in the common control channel, and information is also received from the base station in the UE-specific control channel, at the at least one supporting UE. A receiver at the at least one supporting UE is configured to independently decode user data for the UE based on the received information.

Other embodiments are also contemplated. For example, a non-transitory processor-readable medium could be used to store instructions that enable a processor to perform a method.

At a base station, such a method for multiple access based on power modulation division communication could involve determining modulation information, capacity information, resource information, and resource assignment information for a plurality of UEs. A method enabled by such instructions could also involve transmitting information to the UEs in a common control channel in accordance with the determined modulation information, capacity information and resource scheduling information, and transmitting information to at least one of the UEs in a UE-specific control channel in accordance with the determined resource assignment information.

Another method for multiple access based on power modulation division communication enabled by stored instructions could be performed at a UE. In this case, the method could involve receiving information, from a base station in a common control channel in accordance with modulation information, capacity information, and resource scheduling information. The method could also include receiving information, from the base station in a UE-specific control channel in accordance with resource assignment information, and configuring a receiver at the UE to independently decode user data for the UE based on the received information.

Other aspects and features of embodiments of the present disclosure will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION

Figure 1:
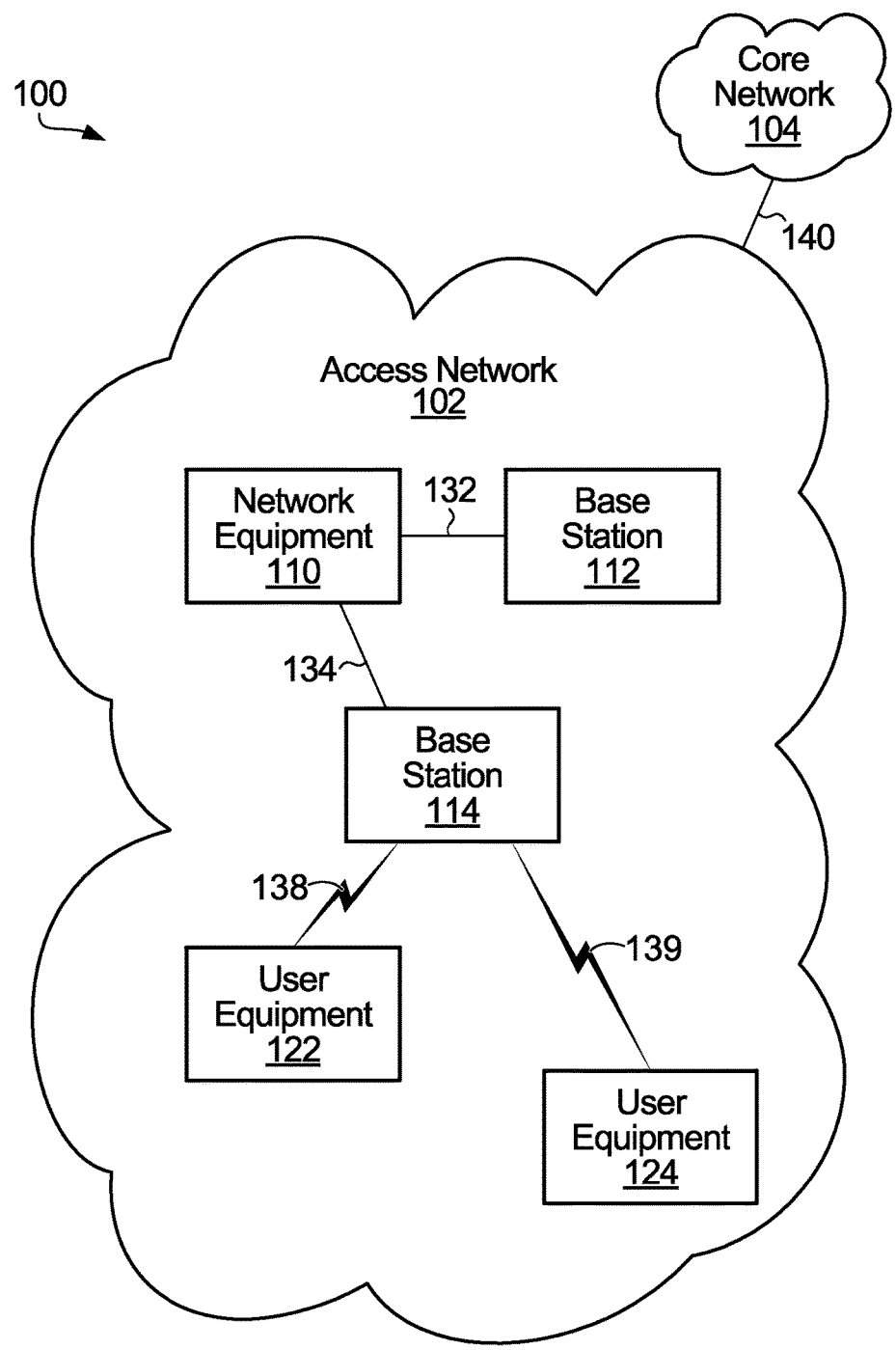
FIG. 1 is a block diagram of an example communication system.

FIG. 1 is a block diagram of an example communication system in which embodiments of the present disclosure could be implemented. The example communication system 100 in FIG. 1 includes an access network 102 and a core network 104. The access network 102 includes network equipment 110 and base stations 112, 114 which communicate with the network equipment over network communication links 132, 134. User equipment 122, 124 communicates with base station 114 in the example shown, over wireless communication links 138, 139. The access network 102 communicates with the core network 104 over another network communication link 140. The core network 104, like the access network 102, may include network equipment that communicates with one or more installations of the network equipment in the access network 102, such as the network equipment 110. However, in a communication system with an access network 102 and a core network 104, the core network might not itself directly provide communication service to user equipment.

The communication system 100 is intended solely as an illustrative example. An access network 102 could include more than one installation of network equipment 110, for example. Also, although only the user equipment 122, 124 is shown as communicating with base station 114, the base station 112 could similarly provide communication service to other user equipment. There could be more than one access network 102 coupled to a core network 104. It should also be appreciated that the present disclosure is not in any way limited to communication systems having an access network/core network structure.

More generally, FIG. 1, as well as the other drawings, are intended solely for illustrative purposes. The present disclosure is not limited to the particular example embodiments explicitly shown in the drawings.

Considering first the access network 102, any of various implementations are possible. The exact structure of network equipment 110, base stations 112, 114, and user equipment 122, 124, is implementation-dependent.

At least the base stations 112, 114 include physical interfaces and communications circuitry to support access-side wireless communications with the user equipment 122, 124 over the wireless access links 138, 139. The access-side physical interfaces at the base stations 112, 114 could be in the form of an antenna or an antenna array, for example. More than one access-side physical interface could potentially be provided at a base station 112, 114. As discussed in further detail herein, control signaling may enable user equipment such as user equipment 122, 124 to communicate with a base station such as the base station 114 in a multiple access system using a single physical interface at the base station and a single wireless link.

The type of communications circuitry coupled to the access-side physical interface(s) at the base stations 112, 114 is dependent upon the type(s) of wireless communication links 138, 139 and the communication protocol(s) used to communicate with the user equipment 122, 124.

The base stations 112, 114 also include a network-side physical interface, or possibly multiple network-side physical interfaces, and communications circuitry to enable communications with other network equipment in the access network 102, such as the network equipment 110. The network equipment 110 may also include one or more network-side physical interfaces and communications circuitry to enable communications with network equipment in the core network 104 over the communication link 140. There could be multiple communication links between network equipment such as network equipment 110 in the access network 102 and network equipment in the core network 104. Network-side communication links 132, 134 that are in the access network 102, and the communication link 140 to the core network 104, could be the same type of communication link. In this case the same type of physical interface and the same communications circuitry at the network equipment 110 and at the base stations 112, 114 could support communications between the network equipment and the base stations within the access network 102 and between the access network 102 and the core network 104. Different physical interfaces and communications circuitry could instead be provided at the network equipment 110 and the base stations 112, 114 for communications within the access network 102 and between the access network 102 and the core network 104.

Network equipment in the core network 104 could be similar in structure to the network equipment 110. However, as noted above, network equipment in the core network 104 might not directly provide communication service to user equipment and therefore might not include access-side physical interfaces for access communication links or associated access-side communications circuitry. Physical interfaces and communications circuitry at network equipment in the core network 104 could support the same type(s) of network communication link(s) as in the access network 102, different type(s) of network communication link(s), or both.

Just as the exact structure of physical interfaces at network equipment 110, base stations 112, 114, and network equipment in the core network 104 is implementation-dependent, the associated communications circuitry is implementation-dependent as well. In general, hardware, firmware, components which execute software, or some combination thereof, might be used in implementing such communications circuitry. Electronic devices that might be suitable for implementing communications circuitry include, among others, microprocessors, microcontrollers, Programmable Logic Devices (PLDs), Field Programmable Gate Arrays (FPGAs), Application Specific Integrated Circuits (ASICs), and other types of "intelligent" integrated circuits. Software could be stored in memory for execution. The memory could include one or more physical memory devices, including any of various types of solid-state memory devices and/or memory devices with movable or even removable storage media.

The user equipment 122, 124, also referred to herein as UEs, includes a physical interface and communications circuitry compatible with an access-side physical interface and communications circuitry at the base station 114, to enable the UEs to communicate with the base station. Multiple physical interfaces of the same or different types could be provided at the UEs 122, 124. The UEs 122, 124 could also include such components as input/output devices through which functions of the UEs are made available to a user. In the case of a wireless communication device such as a smartphone, for example, these functions could include not only communication functions, but other local functions which need not involve communications. Different types of UEs 122, 124, such as different smartphones for instance, could be serviced by the same base station 114.

The communication links 138, 139 are wireless links, and any of the communication links 132, 134, 140, and communication links in the core network 104 could potentially be or include wireless communication links. Such communication links tend to be used more often within an access network 102 than in a core network 104, although wireless communication links at the core network level are possible. A single antenna or an antenna array including multiple antenna elements could be used at each end of a wireless communication link to enable communications over the air.

Although the wireless links 138, 139 are shown separately in FIG. 1, this is not intended to indicate that a separate antenna and link are provided at the base station 114 for each UE 122, 124. Embodiments disclosed herein may support superposition of data for both UEs 122, 124 over the same wireless link.

According to one possible multiple access technique for downlink wireless communications from a base station such as the base station 114 to user equipment such as the UEs 122, 124, multiple access is provided through power modulation division between UEs. For example, the base station 114 could control downlink (DL), per UE, power allocation on the wireless links 138, 139. The base station 114 could also control division of modulation between UEs 122, 124 for multiple access, by superimposing UE signals in a constellation domain. Each UE 122, 124 could then apply independent decoding to signals it receives on a data channel, with each UE decoding only its own signal using its own mapping information. One such power and modulation division multiple access technique is referred to as Semi-Orthogonal Multiple Access (SOMA).

The interference between UEs in this type of multiple access technique is structured, in which case there is no Successive Interference Cancellation (SIC) or Treating Interference as Noise (TIN). The independent decoding can be performed by each UE based on power offsets and mapping information. Embodiments of the present disclosure relate to control signaling that enables UEs to perform independent decoding in power/modulation multiple access systems.

Figure 2:
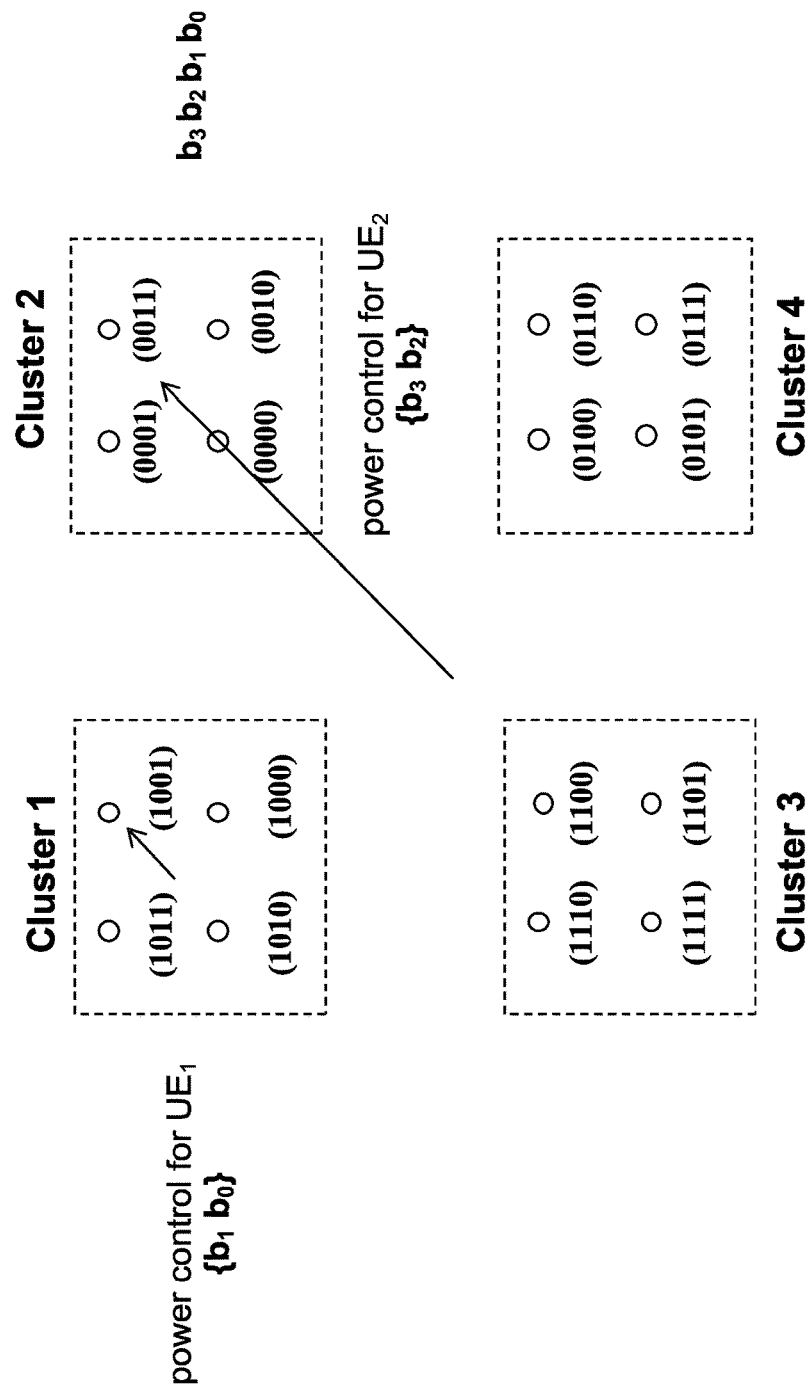
FIG. 2 illustrates an example constellation.

FIG. 2 illustrates an example constellation, which exhibits a symmetric sub-constellation map for b1/b0 in different clusters. Considering clusters 1 and 2, for example, the b1/b0 bits in the symbols in each cluster are symmetric. From left to right along the top rows of clusters 1 and 2 are symbols (10<u>11</u>) (1001) (0001) (00<u>11</u>), with underlining and bold added herein to designate the b1/b0 symmetry. Such b1/b0 symmetry exists between the second rows of cluster 1 and 2, and also between clusters 3 and 4. In a vertical direction in FIG. 2, there is b1/b0 symmetry between clusters 1 and 3 and between clusters 2 and 4.

b1/b0 can be decoded by a UE to which these bits are assigned, which is $UE_1$ in the example shown in FIG. 2, relying only on the constellation map within a cluster and without the knowledge of b2/b3. Decoding by $UE_1$ is independent of decoding by the other $UE_2$ in this example, even though symbols include both bits that are assigned to $UE_1$ and bits that are assigned to $UE_2$. The arrows in FIG. 2 represent power offsets assigned to the UEs. $UE_2$ has a larger power offset than $UE_1$ in FIG. 2, and this reflects power settings by a base station when $UE_2$ is farther away from the base station than $UE_1$, as in the case of UE 124 (FIG. 1) relative to UE 122.

The actual decoding of symbols and user data for each UE relates to a multiple access technique itself, rather than control signaling as disclosed herein. Briefly, symbol decoding is based on per-UE power offsets and per-UE mappings.

There could be certain common control information for all UEs that are participating in multiple access on a wireless link. This common control information is set by a base station. According to an embodiment, the common control information includes the following:

Power/Modulation division multiple access mode (PM):
    PM=0: off (power/modulation division multiple access transmission mode is disabled. This means legacy multiple access)
    PM=1: on (power/modulation division multiple access transmission mode is enabled)

Worst UE mode (WUM):
   WUM=0: The worst UE (farthest from the base station, which is UE 124 in FIG. 1) uses a legacy receiver (i.e., treating interference as noise)
   WUM=1: The worst UE uses a receiver that supports multiple access based on power/modulation division
Two-UE pairing mode (TUPM)
   TUPM=0: off (more than two UEs can be participating in multiple access on each scheduled resource element (RE))
   TUPM=1: on (only two UEs are participating in multiple access on each scheduled RE)
Scheduling mode (SCHM):
   SCHM=0: Block-continuous, wherein Resource Blocks (RBs) that carry user data are continuous
   SCHM=1: Block-noncontinuous, wherein RBs that are used to carry user data are not continuous
   SCHM=3: Individual signaling, which is less structured for user data transmission.

Such common control information, when used, is set by a base station as noted above and is communicated to UEs. Although this common control information is also used herein to denote different multiple access scenarios, it should be appreciated that this specific common control information need not be signaled, or even used, in every embodiment. For instance, PM mode information could potentially be signaled at a higher control level than the other common control information listed above. If PM is set to 0 (off), then power/modulation division multiple access transmission mode is disabled, and legacy multiple access is to be used. In this case there would be no reason to transmit the other common control information listed above.

As a further illustrative example, consider an embodiment in which three constellation types (CTs) are supported:
   CT1: 16QAM (Quadrature Amplitude Modulation)—4 bits per symbol
   CT2: 64QAM—6 bits per symbol
   CT3: 256QAM—8 bits per symbol.

More or fewer constellation types, which need not necessarily be based on QAM constellations, could be supported.

The following information could be signaled to UEs in a common control channel:
   Constellation types
   Number of layers for each CT (although this could instead be inferred without being separately signaled to the UEs as noted below)
   Scheduled RB region(s) for each CT
   Power offsets for each CT.

The "layers" above refer to symbol bit allocations. There are several layering options, including the following:
   Option #1: Number of bits per layer is fixed, at 2 bits for example (the number of bits is fixed and thus need not be communicated, a UE could be assigned multiple layers, and different UEs could be assigned different numbers of layers)

$$\underbrace{b_1^1, b_0^1}_{Layer\ 1}, \underbrace{b_1^2, b_0^2}_{Layer\ 2}, \ldots, \underbrace{b_1^L, b_0^L}_{Layer\ L}$$

Option #2: Number of bits per layer is not fixed (each UE could be assigned one layer, but layer sizes could be different for different UEs)

$$\underbrace{b_{n_1-1}^1, \ldots, b_0^1}_{Layer\ 1}, \underbrace{b_{n_2-1}^2, \ldots, b_0^2}_{Layer\ 2}, \ldots, \underbrace{b_{n_L-1}^L, \ldots, b_0^L}_{Layer\ L}$$

Consider an example of a fixed number of bits (specifically 2 bits) per layer, PM=1 (on), WUM=0 (worst UE is a legacy receiver), TUPM=0 (off), and SCHM=0 (block-continuous). For ease of reference, this example scenario is designated "Case 1". In an embodiment, common control information occupies three predefined control blocks (CBs), referred to as CB1, CB2, and CB3, each corresponding to a CT and a scheduled RB region in a data channel. A scheduled RB region is an example of a multiple access block of resources used in providing multiple access. In each CB, the following information is signaled:
   CT (CT1, CT2, or CT3)
      the number of layers (L) for CTi is i+1, and can be determined by each UE without having to be signaled in the case of a fixed number of 2 bits per layer in this example
   Number (N) of the scheduled RBs in the data channel
      scheduled RBs of the current CB can be calculated at the UE side, without being separately signaled to the UEs:
         each UE obtains the exact RB ranges using $(1,N_1)$, $(N_1+1,N_1+N_2)$, and $(N_1+N_2+1,N_1+N_2+N_3)$, where $N_1$ is the length of the scheduled RBs for CB1 beginning at RB index 1, $N_2$ is the length of the scheduled RBs for CB2 (beginning at RB index $N_1+1$), and $N_3$ is the length of the scheduled RBs for CB3 (beginning at RB index $N_1+N_2+1$) in this example of block-continuous RBs
         each UE determines the CB to which it belongs by comparing its assigned RBs (signaled in a UE-specific control channel, for example, as described below) with the calculated RB ranges. A UE belongs to the CB corresponding to the calculated RB range into which its assigned RBs fall.
   Power offsets $PO_1, \ldots, PO_{L-1}$:
      In an embodiment, a power reference $P_i^{max}$ is available at each $UE_i$ and need not be signaled
      The power of layer j at $UE_i$ is:

$$P_i^j = P_i^{max} - \sum_{k=1}^{L-j} PO_{L-k}$$

Power offsets could be chosen by the base station, from a predefined table stored in memory. In this case the index of each power offset from the corresponding table could be signaled to the UEs.

Although the CBs in this example each correspond to a CT and a scheduled RB region in a data channel, it should be noted that CBx need not correspond to CTx. For example, CB1 could be used to signal common control information for CT3.

Other common control information, such as PM, WUM, TUPM, and SCHM, could also be signaled in the common control channel, in separate CBs assigned for this purpose, for example.

A single BS in this example could be providing multiple access to the same wireless link by different groups of UEs using different CTs. One group of UEs could be sharing the link under CT1 multiple access, a second group of UEs could be sharing the same link under CT2 multiple access, and a third group of UEs could be sharing the same link under CT3 multiple access. It is also possible for a base station to provide multiple access for different wireless links.

Figure 3:
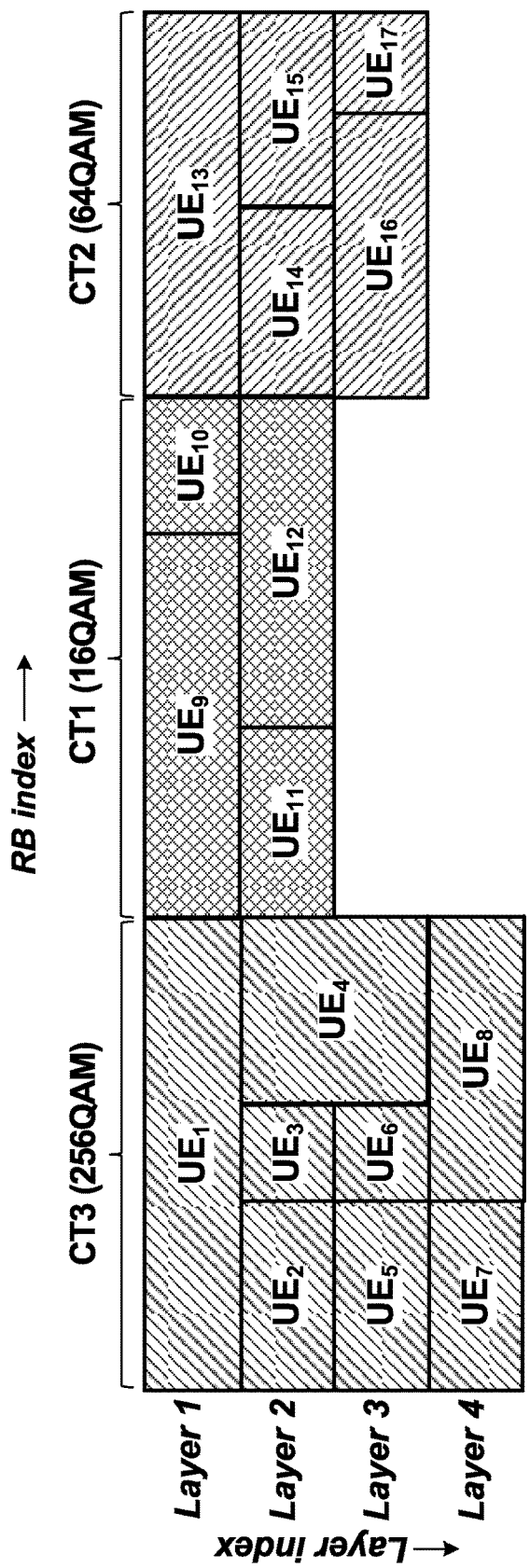
FIG. 3 illustrates an example RB and layer assignment.

FIG. 3 illustrates an example RB and layer assignment. In the example shown in FIG. 3, a multiple access block for CT3 has 4 layers, a multiple access block for CT1 has 2 layers, and a multiple access block for CT2 has 3 layers. Within each layer, RBs may be assigned to only one UE as shown for layer 1 of the multiple access blocks for CT2 and CT3, or to multiple UEs as shown for other layers in FIG. 3. The layer assignment example in FIG. 3 also illustrates that a UE may have multiple assigned layers, as in the case of $UE_4$ in the multiple access block for CT3. If a base station is running a multiple access allocation as shown in FIG. 3, then 17 UEs have access to the same wireless link. This is an example, and access to more or fewer UEs could be provided.

Common control information and an example of control blocks for signaling the common control information are noted above. In an embodiment, there is also UE-specific control information for each $UE_i$ (except the worst UE, which in the above example of WUM=0 is a legacy receiver). The following represents examples of UE-specific control information which could be signaled to each UE, other than the worst UE, in respective UE-specific control channels:

$n_i$: number of modulation bits (2, 4, 6, . . . , $n_{max}$) assigned to the UE
  Either the number of modulation bits n, or the number of layers could be signaled to UEs in embodiments using a fixed number of modulation bits per layer.
Starting layer index I(i), 0≤I(i)≤L−1
  Each UE can determine its assigned layer(s) based on $n_i$. If $n_i$=2, then the starting layer is the only layer that has been assigned to $UE_i$. Otherwise, the UE is assigned layers I(i) to I(i+($n_i$−2)/2).
Assigned RBs
  Either the assigned RBs or assigned layers of different UEs can overlap
  Each scheduled pair (RB, layer) is uniquely assigned to only one UE Case 1 discussed above relates to control signaling in a scenario of a fixed number of 2 bits per layer, WUM=0, TUPM=0, and SCHM=0 (block-continuous). Other scenarios are also possible.

As a further example, consider the above scenario but with TUPM=1 (only 2 UEs). For ease of reference, this example scenario is designated "Case 2". This Case 2 scenario can save on control signaling relative to the TUPM=0 (off) Case 1 scenario, as discussed below.

In the Case 2 scenario, the CT control blocks and RB ranges are scheduled as in the case of TUPM=0, and each CT control block includes common control information:

CT (CT1, CT2, or CT3)
  as above, the number of layers (L) for CTi is i+1, and can be determined by each UE without having to be signaled in the case of a fixed number of 2 bits per layer
Number (N) of the scheduled RBs in the data channel
  as above, scheduled RBs can be calculated at the UEs, without being separately signaled to the UEs, and each UE determines the CB to which it belongs by comparing its assigned RBs with the calculated RB ranges
Only one power offset per CT, and not L−1 power offsets as in Case 1. In a 2-UE scenario with WUM=0, one power offset could be signaled and the other can then be calculated.

Figure 4:
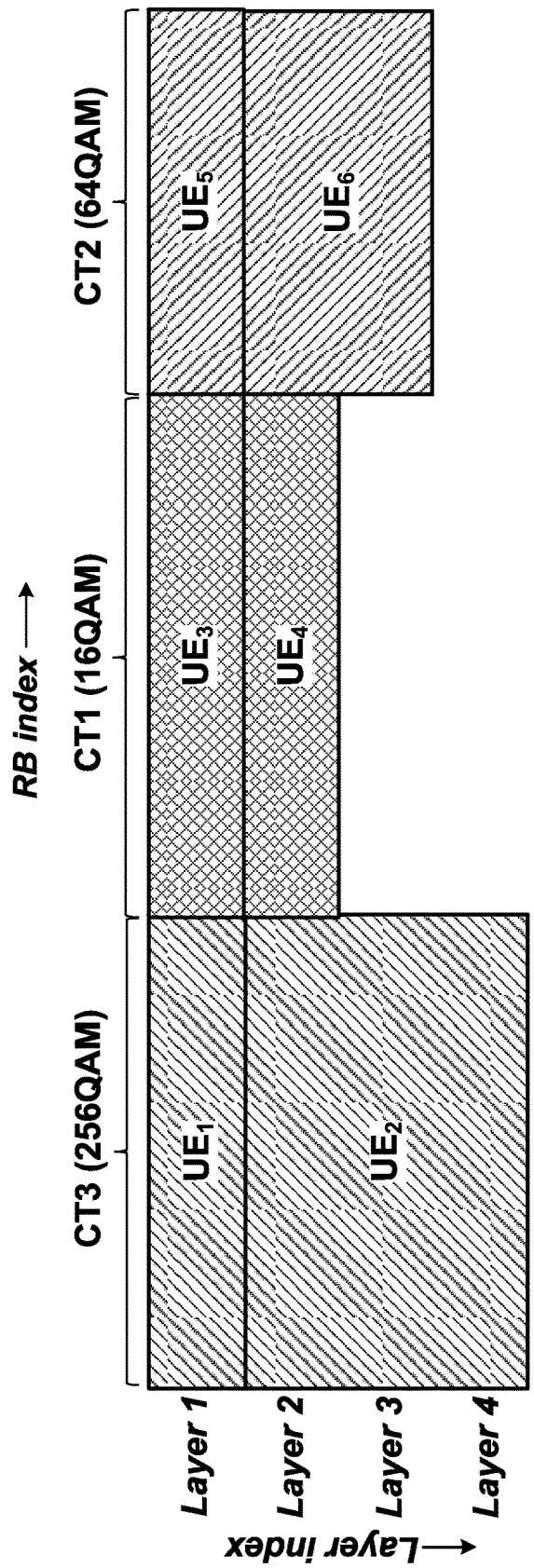
FIG. 4 illustrates another example RB and layer assignment.

For a 2-UE scenario with WUM=0, specific control information for $UE_i$ is signaled in only one UE-specific control channel, for the "good" UE (lowest power, closest to the base station—UE 122 in FIG. 1). The UE-specific control information for the good UE could include:

$n_i$: number of modulation bits (2, 4, 6, . . . , $n_{max}$) assigned to the UE
Assigned RBs In Case 2, although additional assigned bit/layer location information such as a starting layer or bit index could be signaled to the good UE, if there is a predetermined order of layer assignments then the good UE does not need any further information to locate its assigned layer(s). Regarding a predetermined order of layer assignments, the worst UE in a multiple access group could always be assigned its layer(s) starting with layer 1, for example. Suppose that the worst UE has layer 1 assigned, and all other layers are assigned to the other UE since there are only two UEs in this example. With reference to FIG. 4, which illustrates another example RB and layer assignment, $UE_3$ is the worst UE and is assigned layer 1 in the multiple access block for CT1, and therefore the number of assigned bits signaled to $UE_4$ in its UE-specific control channel indicates that $UE_4$ has 2 modulation bits (1 layer in this example) assigned. In this case, $UE_4$ uses RB information to determine that it falls into the multiple access block for CT1 which has 2 layers, and that it is assigned layer 2 since $UE_3$ has 1 layer assigned and the layer assignment for the worst UE always starts with layer 1. Similarly, for the multiple access blocks for CT2 or CT3, the numbers of assigned bits signaled to $UE_2$ and $UE_6$ in their UE-specific control channels indicate that $UE_2$ has 6 modulation bits (3 layers) assigned and $UE_6$ has 4 modulation bits (2 layers) assigned, respectively. In light of the predetermined order of layer assignments in this example, $UE_2$ can determine that its assigned layers are layers 2 to 4 in the multiple access block for CT3 and $UE_6$ can determine that its assigned layers are layers 2 and 3 in the multiple access block for CT2.

A good UE can similarly determine its assigned layer(s) without using a starting layer index if the worst UE were assigned multiple layers in the multiple access blocks for CT2 and CT3 and the number of assigned layers or bits is signaled to the good UE in its UE-specific control channel. The technique could also be applied for a predetermined order of assignment in which the good UE is assigned its layer(s) starting with layer 1. The good UE would then determine its assigned layers directly from the signaled number of layers or bits in its UE-specific layer information.

The Case 2 scenario with TUPM=1 (on) avoids signaling of L−2 power offsets per CT compared to the Case 1 scenario, as only 1 power offset is signaled per CT with TUPM=1 (on) instead of L−1 power offsets per CT with TUPM=0 (off).

Although FIG. 4 illustrates multiple access blocks in which all RBs at each layer are assigned to only one UE, in other embodiments different RBs in the same layer could be assigned to different UEs, as shown for several layers in FIG. 3.

In the above examples, SCHM=0, for block-continuous resource allocation. Consider now a further example ("Case 3") of a fixed number of bits (specifically 2 bits) per layer, PM=1 (on), WUM=0 (worst UE is a legacy receiver), TUPM=0 (off), and SCHM=1 (block-noncontinuous). This corresponds to Case 1 above, but with SCHM=1 instead of SCHM=0.

In a block-noncontinuous scenario, there are $n_B$ multiple access blocks, such as scheduled RB regions, and in an embodiment, the common control channel occupies $n_B$ predefined CBs. Each CB is respectively associated with a multiple access block. For example, each CB could correspond to a CT and a scheduled RB region in a data channel, For Case 1 and Case 2 above, the scheduling mode is block-continuous with a fixed, predetermined number of multiple access blocks, CTs, and CBs. In Case 3, the scheduling mode is block-noncontinuous, and the number $n_B$ of multiple access blocks and CBs is not fixed. $n_B$ is therefore also signaled in the common control channel. As noted above, other common control information such as PM, WUM, TUPM, and SCHM could be signaled in the common control channel, in separate CBs assigned for this purpose, for example, and in an embodiment $n_B$ is also signaled along with this other common control information.

In each of the $n_B$ CBs for Case 3, the following information could be signaled:
 CT (CT1, CT2, or CT3)
  the number of layers (L) for CTi is i+1, and can be determined by each UE without having to be signaled in the case of a fixed number of 2 bits per layer
 Number (N) of each the scheduled RBs in the data channel
  scheduled RBs of the current CB can be calculated at the UE side, without being separately signaled to the UEs:
   each UE obtains the exact RB ranges using $(1,N_1)$, $(N_1+1,N_1+N_2)$, ..., and $(N_1+ \ldots +N_{n_B-1}+1, N_1+ \ldots +N_{n_B})$, where $N_1$ is the length of the scheduled RBs for CB1 beginning at RB index 1, $N_2$ is the length of the scheduled RBs for CB2 (beginning at RB index $N_2+1$), and so on, up to $N_{n_B}$, which is the length of the scheduled RBs for $CB_{n_B}$ (beginning at RB index $N_1+ \ldots +N_{n_B-1}+1$) in this example of block-noncontinuous RBs
   each UE determines the CB to which it belongs by comparing its assigned RBs with the calculated RB ranges, as described above for Case 1 and Case 2. A UE belongs to the CB corresponding to the calculated RB range into which its assigned RBs fall.
 Power offsets $PO_1, \ldots, PO_{L-1}$, as described above for Case 1.

UE-specific control information could be signaled in a UE-specific control channel. The UE-specific control information for Case 3 could be the same as for Case 1.

Figure 5:
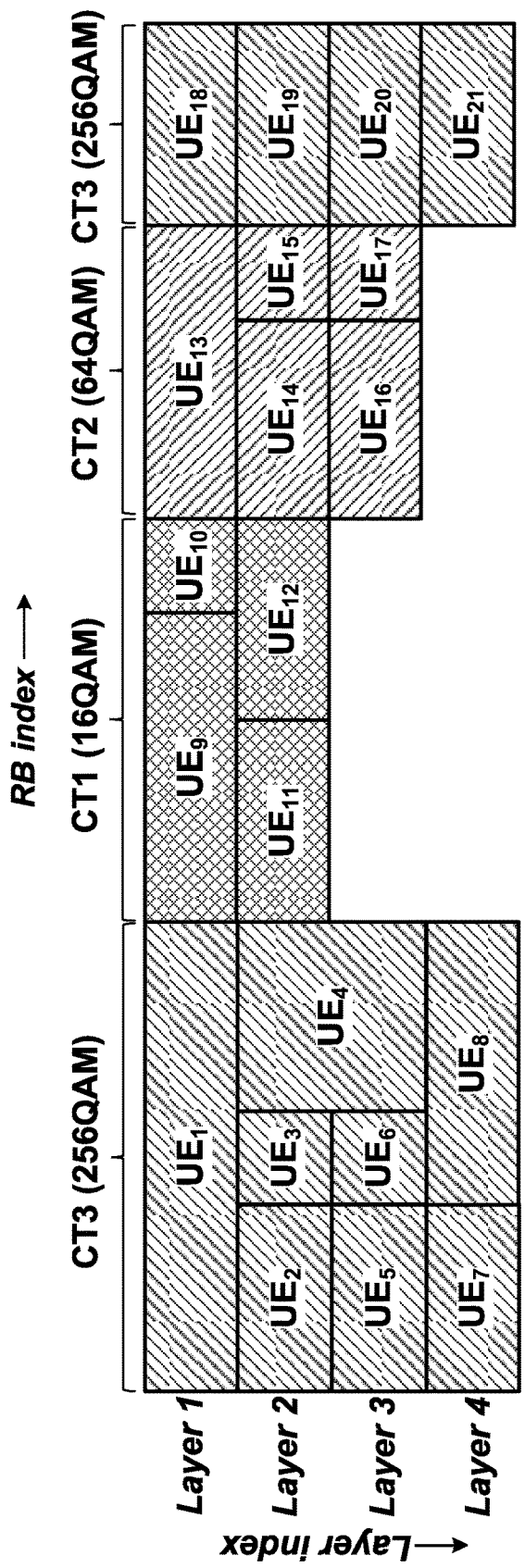
FIG. 5 illustrates a further example RB and layer assignment.

FIG. 5 illustrates a further example RB and layer assignment, this time for Case 3 with $n_B=4$. In the example shown in FIG. 5, there are four multiple access blocks or RB regions, including two CT3 multiple access blocks with 4 layers, a CT1 multiple access block with 2 layers, and a CT2 multiple access block with 3 layers. Within each layer, as in Case 1, RBs may be assigned to only one UE as shown for $UE_1$, $UE_{13}$, and $UE_{18}$ to $UE_{21}$, or to multiple UEs as shown for all of the other UEs in FIG. 5, and a UE may have multiple assigned layers as in the case of $UE_4$ in the first CT3 multiple access block.

With the four multiple access blocks shown in FIG. 5, 21 UEs have access to the same wireless link. This is an example, and different numbers of multiple access blocks, with similar or different assignments or allocations of UEs to layers/RBs, could provide multiple access for more or fewer UEs. The mix of CTs could also be different from that shown in FIG. 5.

Comparing Case 1 and Case 3, the switch from block-continuous (Case 1) to block-noncontinuous (Case 3) changes the number of CBs and the number of multiple access blocks or RB regions from 3 to $n_B$. This could reduce the amount of control signaling if $n_B<3$, which might be the case if three multiple access blocks (Case 1) are not needed to support a desired level of multiple access. For $n_B>3$, there would be more CBs, but there would also be more than 3 multiple access blocks or RB regions, which could support multiple access for more UEs, for example. A block-noncontinuous scenario such as Case 3 also provides for a mix of CTs, whereas in a block-continuous scenario such as Case 1, there is a fixed multiple access block distribution including one CT1 multiple access block, one CT2 multiple access block, and one CT3 multiple access block.

Case 2 above corresponds to Case 1, but with TUPM=1 (only 2 UEs) instead of TUPM=0. Consider a similar example relative to Case 3, with TUPM=1. For ease of reference this further example is designated "Case 4". The control blocks and RB ranges are scheduled as in Case 3, $n_B$ is also signaled in the common control channel as in Case 3, and each CB includes common control information:
 CT (CT1, CT2, or CT3)
  as above, the number of layers (L) for CTi is i+1, and can be determined by each UE without having to be signaled in the case of a fixed number of 2 bits per layer
 Number (N) of the scheduled RBs in the data channel
  as above, scheduled RBs can be calculated at the UEs, without being separately signaled to the UEs, and each UE determines the CB to which it belongs by comparing its assigned RBs with the calculated RB ranges
 Only one power offset per CT, and not L−1 power offsets. As noted above for Case 2, in Case 4 with only two UEs, one power offset is signaled and the other can be calculated.

Case 4 is also similar to Case 2 in terms of UE-specific control information, which is signaled in only one UE-specific control channel, for the "good" UE (lowest power, closest to the base station—UE 122 in FIG. 1) since the other UE is a legacy receiver. The UE-specific control information for the good UE could include:
 $n_r$: number of modulation bits (2, 4, 6, ..., $n_{max}$) assigned to the UE
 Assigned RBs The good UE in Case 4 could use a predetermined order of layer assignments in locating its assigned layer(s), as discussed in detail above for Case 2.

Relative to Case 3, Case 4 avoids signaling of L−2 power offsets per CB. Only 1 power offset is signaled per CB in Case 4, instead of L−1 power offsets per CB in Case 3.

Figure 6:
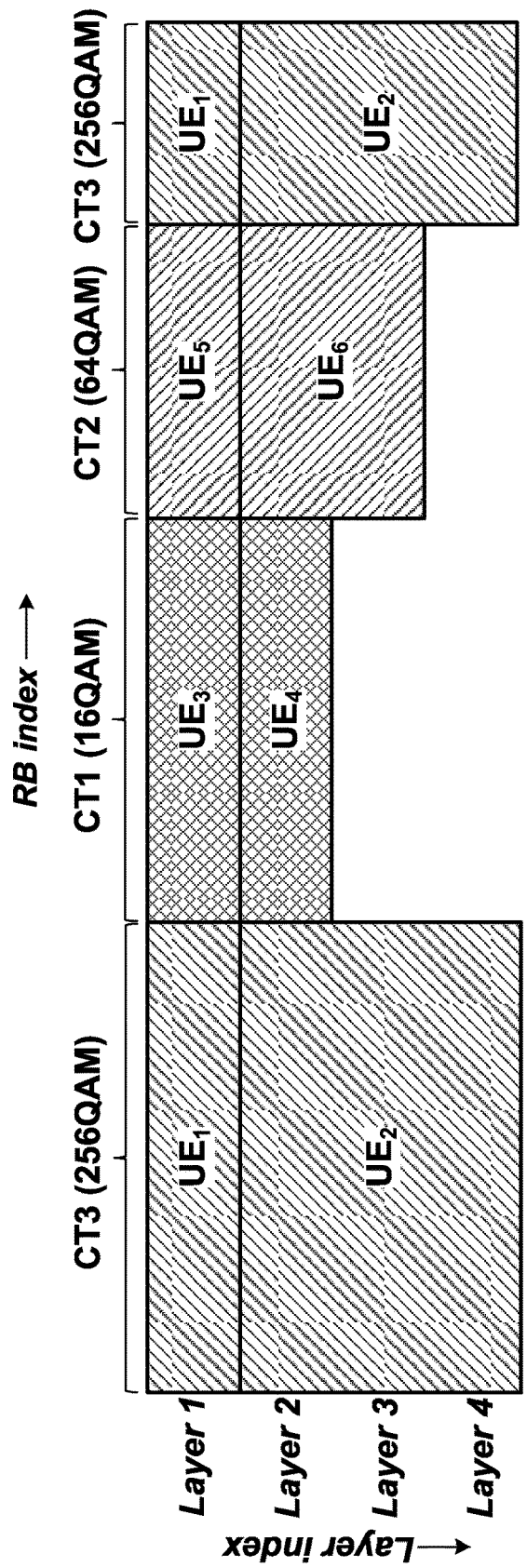
FIG. 6 illustrates yet another example RB and layer assignment.

FIG. 6 illustrates yet another example RB and layer assignment, under Case 4. There are four multiple access blocks ($n_B=4$), with layers uniquely assigned to one of two different UEs. In other embodiments, different RBs in the same layer could be assigned to different UEs.

There are other scenarios corresponding to other combinations of WUM, TUPM, SCHM, and fixed or variable bits per layer. For example, in scenarios with WUM=1 (the worst UE uses a receiver that supports multiple access based on power/modulation division), there is no "exception" as in the above scenarios, and the UE-specific control information is signaled to all UEs. For SCHM=2 (individual signaling), there could be additional signaling in common and UE-specific control information to identify data resources, for example. In the case of variable bits per layer, $n_i$ could be signaled on the UE-specific control channel as in the examples above, and additional bit location information could be signaled on the UE-specific control channel instead of the starting layer index if TUPM=0 (off), to allow each UE to determine location(s) of its assigned layer(s).

Figure 7:
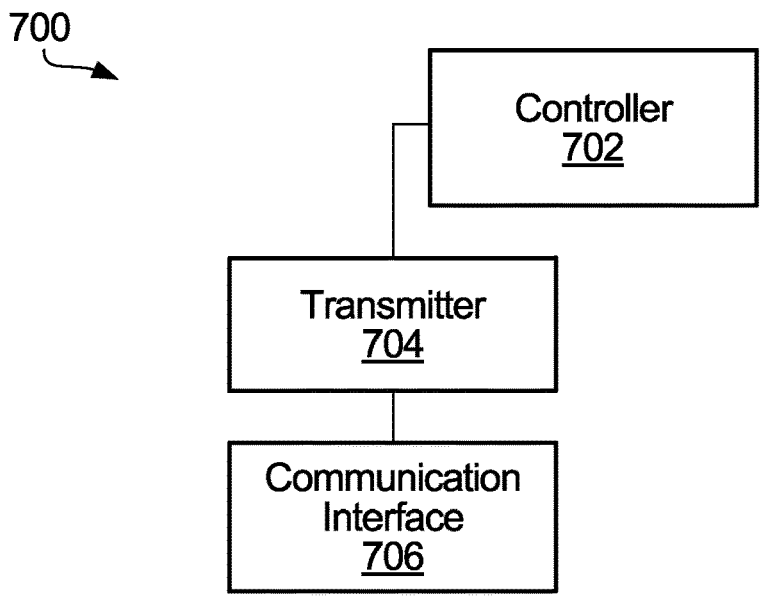
FIG. 7 is a block diagram of an example base station.

FIG. 7 is a block diagram of an example base station. The example base station 700 includes a controller 702, a transmitter 704, and a communication interface 706. The transmitter 704 and the communication interface 706 are illustrative of a base station access-side physical interface and communications circuitry noted above with reference to FIG. 1. The controller 702 could be implemented in hardware, firmware, or one or more components to execute software. In one embodiment, the controller 702 is implemented using a processor. The processor is intended to be inclusive of various types of electronic devices that could be used in implementing the multiple access controller 702, such as microprocessors, microcontrollers, PLDs, FPGAs, ASICs, and other types of "intelligent" integrated circuits as noted above.

The communication interface 706 includes an antenna, and the transmitter 704 is coupled to the communication interface in this example. The transmitter 704 is configured to transmit transmissions, through the communication interface in the example shown. The controller 702 is coupled to the transmitter 704, and as noted above could be implemented using a processor. In an embodiment, the processor is configured, by executing software for example, to determine modulation information, capacity information, resource scheduling information, and resource assignment information for UEs to access a wireless communication link that is provided by the communication interface 706. The wireless communication link access is based on power modulation division. Examples of the modulation information (CT), capacity information (WUM), resource scheduling information (RB lengths or ranges) and resource assignment information (n, and layer information such as starting layer index or number of layers, RB assignments) are discussed herein. There could be other such information in other scenarios, as briefly discussed above.

In a processor-based embodiment, the processor that is used to implement the multiple access controller 702 is also configured to provide information to the transmitter 704 for transmission through the communication interface 706 in a common control channel in accordance with the determined modulation information, capacity information and resource scheduling information to the UEs, and to provide information to the transmitter for transmission to a UE through the communication interface in a UE-specific control channel in accordance with the determined UE-specific modulation layer assignment information and resource assignment information.

The processor could also be configured to determine UE pairing information (such as TUPM above) for UEs and provide information to the transmitter 704 for transmission in the common control channel to the UEs in accordance with the UE pairing information.

The processor could also be configured to provide information to the transmitter 704 for transmission to the UE through the communication interface in the UE-specific control channel in accordance with an index for an assigned modulation layer for the UE.

The resource assignment information indicates assigned resource blocks for the UE in one embodiment.

The UE could be overlapped with another UE in either assigned modulation layer or assigned resource blocks if the UE pairing information indicates more than two UEs are paired.

The capacity information indicates whether a UE with worst receive performance in the plurality of UEs supports multiple access based on power modulation division, in an embodiment.

The resource scheduling information could include information indicative of a resource block region scheduling type for the UEs, such as continuous block scheduling, non-continuous block scheduling and individual signaling.

The processor could be further configured to provide information to the transmitter 704 for transmission through the communication interface in accordance with constellation types of the UEs. In an embodiment, the processor is configured to assign a respective power offset to be used for each of multiple modulation layers in an assigned resource block for each of the constellation types.

It should be appreciated that the example base station 700 is provided for illustrative purposes, and only components involved in control signaling are shown in FIG. 7. A base station could include other components as well, to support network-side communication links for example.

Figure 8:
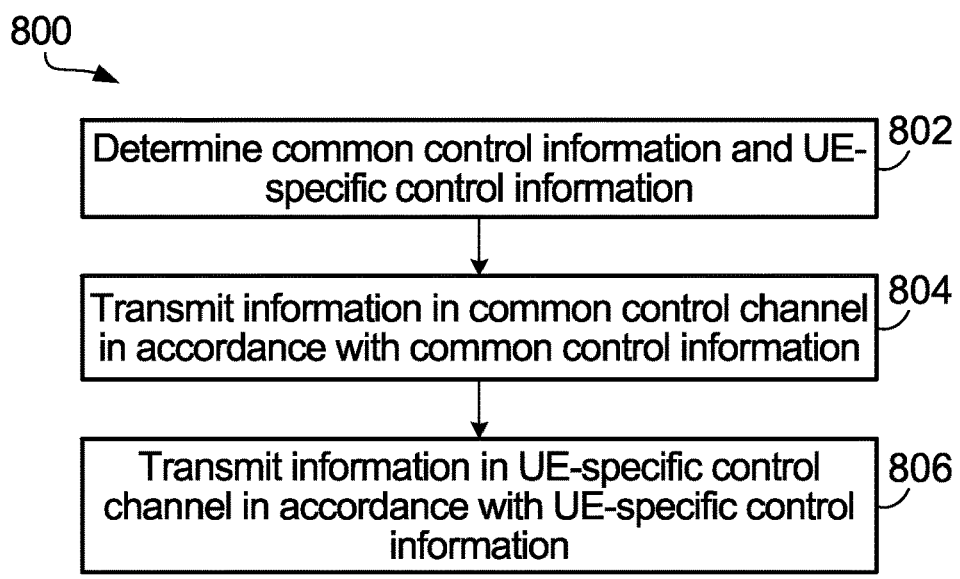
FIG. 8 is a flow diagram of an example method.

FIG. 8 is a flow diagram of an example method for multiple access based on power modulation division communication, which would be performed at a base station. The example method 800 includes, at 802, determining modulation information, capacity information, resource scheduling information, and resource assignment information for a plurality of UEs. The determining in FIG. 8 is shown as a single block 802 to illustrate that determination of common and UE-specific control information need not necessarily be separate processes. Modulation layer and resource allocations, for example, could be determined as part of the same multiple access processing which handles power optimization and setting layers and resources.

At 804, information is transmitted to UEs in a common control channel, in accordance with common control information including the determined modulation information, capacity information, and resource scheduling information, and at 806 information is transmitted to a UE in a UE-specific control channel in accordance with the determined resource assignment information. These operations are shown separately in FIG. 8 since they involve different channels in the embodiment shown. However, these channels need not be transmitted at different times, and could partially or entirely overlap in time.

FIGS. 7 and 8 represent illustrative examples of base station equipment and a base station method. There may be variations in other embodiments. For example, as described herein the common control channel could include control blocks associated with respective multiple access blocks scheduled on a data channel. In Case 1 and Case 2 above, there are three CBs, each corresponding to a constellation type and a scheduled resource region. This correspondence is an example of an association between control blocks and multiple access blocks. Similarly, in Case 3 and Case 4 above, there are $n_B$ CBs associated with $n_B$ multiple access blocks.

Control blocks correspond to constellation types and multiple access blocks in Cases 1 to 4. A respective constellation type to be used in modulating data for transmission in each multiple access block could be selected, by the multiple access controller 702 in FIG. 7 or a processor implementing the multiple access controller, for example. Different multiple access blocks could have different selected constellation types, as in the block-continuous examples in Case 1 and Case 2. For block-noncontinuous embodiments, there could be more than one multiple access block using the same constellation type. This is shown by way of example in FIG. 6, in which the first and last multiple access blocks have the same constellation type. In either case, the modulation information for each control block may include information such as CT1, CT2, or CT3 in Cases 1 to 4, that is indicative of the constellation type selected for the multiple access block with which the control block is associated.

Resource information for each control block could include information that is indicative of a resource block region scheduled on the data channel for the multiple access block with which the control block is associated. The length or number (N) of scheduled RBs as referenced above are examples of such resource information.

A respective power offset to be used in transmitting data at each of a number of modulation layers in each multiple access block could also be assigned. This could be an additional operation in the example method 800 in FIG. 8, for example. In an apparatus embodiment, the controller 702 in FIG. 7 or a processor implementing the controller could be configured to assign a respective power offset for each modulation layer in each multiple access block. These assignments could be made by choosing power offsets from a predefined table stored in memory. Such a table could be stored in the same memory device(s) in which software is stored for execution by a processor that implements the controller 702, for example, or separately. A corresponding table could similarly be stored in one or more memory devices at each UE that supports power and modulation division multiple access.

Power information for each control block could include information indicative of a power offset assigned to a modulation layer in the multiple access block with which the control block is associated. This power information could be in the form of an index of each power offset in a table that is stored in memory and from which power offsets are selected by a base station. A UE could then use the same indices to access a corresponding table and determine the power offset for each modulation layer.

UE-specific modulation layer assignment information for a UE could include information indicative of at least one modulation layer to which the UE is assigned by the base station. Thus, a method could involve assigning each of the UEs to at least one modulation layer of at least one multiple access block, and similarly the multiple access controller 702 in FIG. 7 or a processor implementing the controller could be configured to assign each of the UEs to at least one modulation layer of at least one multiple access block.

There could also be assignments of one or more scheduled resource blocks on a data channel to each UE. This could be handled by the controller 702 or a processor that is configured to assign at least one scheduled resource block on a data channel to each of the UEs, for example, or as part of a method in another embodiment. UE-specific resource assignment information for a UE could then include information, such as assigned RBs, indicative of the at least one scheduled resource block that is assigned to the UE.

Layer and resource assignments are referenced above. Either assigned layers or assigned resources of different UEs may overlap, but a scheduled resource/layer pair assignment is unique to only a single UE.

Not every UE in a communication system would necessarily be a supporting UE that supports multiple access based on power and modulation division. The above Cases 1 to 4, for example, relate to scenarios in which the worst UE has a legacy receiver. Thus, there could be one or more supporting UEs that support multiple access based on power modulation division and one or more legacy UEs that support legacy multiple access to a wireless communication link.

At the base station, information could be transmitted in a respective UE-specific control channel for only each supporting UE. In the example base station 700 of FIG. 7, the controller 702 or a processor implementing the controller could be configured to provide information to the transmitter 704 for transmission through the communication interface 706 in the UE-specific control channel(s) for the supporting UE(s). With reference to FIG. 8, the transmitting at 806 could be limited to transmitting information in only the UE-specific control channel for each supporting UE.

Figure 9:
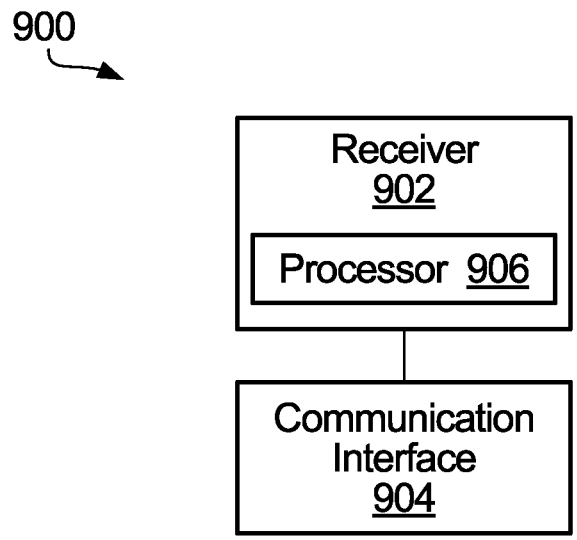
FIG. 9 is a block diagram of example User Equipment (UE).

Considering the UE side in more detail, FIG. 9 is a block diagram of example UE 900, which includes a receiver 902 operatively coupled to a communication interface 904. The receiver 902 and the communication interface 904 are illustrative of a UE physical interface and communications circuitry noted above with reference to FIG. 1.

The communication interface 904 includes an antenna, and is coupled to the receiver 902. The example UE 900 illustrates a processor-based embodiment in which the receiver includes the processor 906. The processor 906 is intended to be inclusive of various types of electronic devices that could be used in implementing the receiver 902, such as microprocessors, microcontrollers, PLDs, FPGAs, ASICs, and other types of "intelligent" integrated circuits as noted above.

The processor 906 is configured, by executing software for instance, to receive information from a base station in a common control channel in accordance with modulation information, capacity information, and resource scheduling information. The processor 906 is further configured to receive information, from the base station in a UE-specific control channel in accordance with resource assignment information, and to configure the receiver 902 to independently decode user data for the UE based on the received information.

As noted above for the example base station 700 in FIG. 7, the example UE 900 is similarly for illustrative purposes, and there could be other components in a UE.

In a communication system, there could be multiple base stations, as shown in FIG. 1, and any one or more of those base stations could be implemented as shown in FIG. 7 and described above with reference to FIG. 7. There could also be multiple UEs, including one or more UEs that support multiple access as disclosed herein and are implemented as shown in claim FIG. 9 and described above with reference to FIG. 9. Not all base stations and not all UEs in a communication system necessarily support multiple access as disclosed herein.

Figure 10:
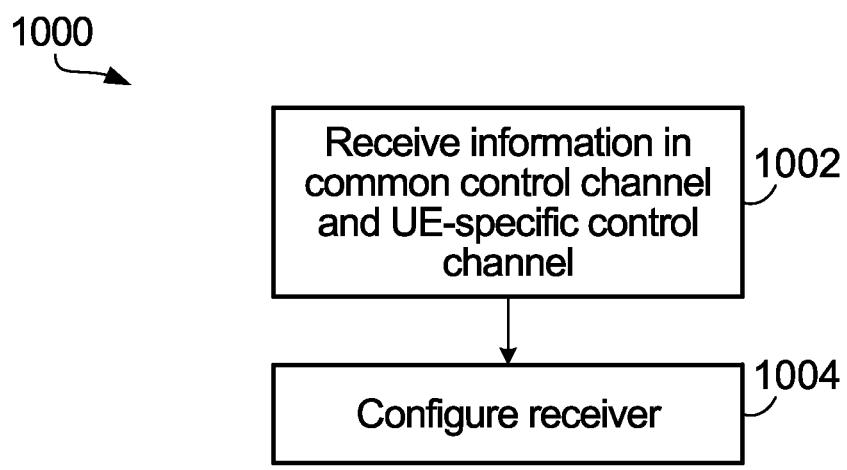
FIG. 10 is a flow diagram of another example method.

FIG. 10 is a flow diagram of another example method 1000, which would be performed at a supporting UE that supports power modulation division multiple access. The example method 1000 includes receiving from a base station, at 1002, information in a common control channel in accordance with modulation information, capacity information, and resource scheduling information, and information in a UE-specific control information in accordance with resource assignment information. Although a single receiving operation is shown at 1002 in FIG. 10, the information in the common control channel and the information in the UE-specific control information are received in different channels. The single receiving operation shown at 1002 in FIG. 10 is intended to illustrate that the information in these channels need not be received at different times.

At 1004, a receiver at the UE is configured to independently decode user data for the UE based on the received information.

The example method 1000, and the example method 800 in FIG. 8, are illustrative embodiments. In other embodiments, similar or different operations could be performed in a similar or different order. Various ways to perform the illustrated operations, as well as examples of other operations that may be performed, are described herein.

Considering operations that could be performed at different equipment in a communication system, for example, a method could involve performing a method as shown in FIG. 8 at each of one or more base stations in a communication system, and performing a method as shown in FIG. 10 at each of one or more UEs in the communication system.

Further variations may be or become apparent. For example, in addition to the UE and method operations discussed above with reference to FIGS. 9 and 10, a determination could be made as to which one of several control blocks applies to a UE. As noted above, the common control channel could include control blocks. Each control block could be associated with a respective one of a number of multiple access blocks scheduled on a data channel. Resource information for each control block could include information indicative of a resource block region scheduled on the data channel for the multiple access block with which the control block is associated, and the UE-specific resource assignment information could include information indicative of at least one scheduled resource block that is assigned to the UE. A determination could be made at the UE as to the multiple access block to which its at least one scheduled resource block belongs, and which control block is associated with the determined multiple access block. The receiver at the UE could then be configured based on the received information.

In an embodiment, the processor 906 (FIG. 9) is configured to handle these operations. With reference to FIG. 10, the example method could include an additional operation of determining, at the UE, to which multiple access block its assigned at least one scheduled resource block belongs and which control block is associated with the determined multiple access block based on the at least one scheduled resource block and the resource information for each control block. The configuring at 1004 could then include configuring the receiver at the UE based on received UE-specific modulation layer assignment information and resource assignment information and power information, modulation information, and resource information in the control block associated with the determined multiple access block.

What has been described is merely illustrative of the application of principles of embodiments of the present disclosure. Other arrangements and methods can be implemented by those skilled in the art. Although the present disclosure refers to specific features and embodiments, various modifications and combinations can be made. The specification and drawings are, accordingly, to be regarded simply as an illustration of embodiments of the invention as defined by the appended claims, and are contemplated to cover any and all modifications, variations, combinations, or equivalents. Thus, it should be understood that various changes, substitutions and alterations can be made herein without departing from the invention as defined by the appended claims.

Moreover, the scope of the present application is not intended to be limited to particular embodiments of any process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments disclosed herein may be utilized. Accordingly, the appended claims are intended to include within their scope such processes, machines, manufacture, compositions of matter, means, methods, or steps.

For example, embodiments may be applicable to various types of communication network equipment and user equipment, to provide 4.5G multiple access technology for instance.

In addition, although described primarily in the context of methods and systems, other implementations are contemplated. Through the disclosure provided herein, embodiments may be implemented by using hardware only or by using a hardware platform to execute software, for example. Embodiments in the form of a software product are also possible. A software product may be stored in a nonvolatile or non-transitory storage medium, which could be or include a compact disk read-only memory (CD-ROM), USB flash disk, or a removable hard disk. More generally, a storage medium could be implemented in the form of one or more memory devices, including solid-state memory devices and/or memory devices with movable and possibly even removable storage media. Such a software product includes a number of instructions, stored on the storage medium, that enable a processor or computer device (personal computer, server, or network device, for example) to execute methods as disclosed herein.

We claim:

1. A base station for multiple access based on power modulation division communication comprising:
a transmitter configured to transmit transmissions;
a controller, coupled to the transmitter, the controller comprising a processor to:
determine modulation information, capacity information, resource scheduling information, and resource assignment information for multiple access that is provided through power modulation division communication for a plurality of User Equipment devices (UEs);
provide information to the transmitter for transmission through a communication interface in a common control channel in accordance with the determined modulation information, capacity information and resource scheduling information to the plurality of UEs; and
provide information to the transmitter for transmission to a UE of the plurality of UEs through the communication interface in a UE-specific control channel in accordance with the determined resource assignment information.

2. The base station of claim 1,
wherein the processor is further configured to determine UE pairing information for the plurality of UEs and provide information to the transmitter for transmission in the common control channel to the plurality of UEs in accordance with the UE pairing information.

3. The base station of claim 2, the processor being configured to provide information to the transmitter for transmission to the UE of the plurality of UEs through the communication interface in the UE-specific control channel in accordance with an index for an assigned modulation layer for the UE.

4. The base station of claim 3, wherein the resource assignment information indicates assigned resource blocks for the UE of the plurality of UEs.

5. The base station of claim 4, wherein the UE is overlapped with another UE of the plurality of UEs in either assigned modulation layer or assigned resource blocks if the UE pairing information indicates more than two UEs are paired.

6. The base station of claim 1, wherein the capacity information indicates whether a UE with worst receive performance in the plurality of UEs supports multiple access based on power modulation division.

7. The base station of claim 1, the resource scheduling information comprising information indicative of a resource block region scheduling type for the plurality of UEs.

8. The base station of claim 7, wherein the resource block region scheduling type comprises continuous block scheduling, non-continuous block scheduling and individual signaling.

9. The base station of claim 1, wherein the processor is further configured to provide information to the transmitter for transmission through the communication interface in accordance with constellation types of the plurality of UEs.

10. The base station of claim 9, the processor being configured to assign a respective power offset to be used for each of a plurality of modulation layers in an assigned resource block for each of the constellation types.

11. A method for multiple access based on power modulation division communication comprising:
determining, at a base station, modulation information, capacity information, resource scheduling information, and resource assignment information for multiple access that is provided through power modulation division communication for a plurality of User Equipment devices (UEs);
transmitting information to the plurality of UEs in a common control channel in accordance with the determined modulation information, capacity information and resource scheduling information;
transmitting information to a UE of the plurality of UEs in a UE-specific control channel in accordance with the determined resource assignment information.

12. The method of claim 11,
determining UE pairing information for the plurality of UEs; and
transmitting information to the plurality of UEs in the common control channel in accordance with the UE pairing information.

13. The method of claim 12, further comprising:
transmitting information to the UE of the plurality of UEs in the UE-specific control channel in accordance with an index for an assigned modulation layer for the UE.

14. The method of claim 13, the resource scheduling information comprising information indicative of a resource block region scheduling type for the plurality of UEs.

15. The method of claim 14, further comprising:
assigning a respective power offset to be used for each of a plurality of modulation layers in an assigned resource block for each of the constellation types.

16. User Equipment (UE) for multiple access based on power modulation division communication comprising:
a receiver, comprising a processor to: receive information, from a base station in a common control channel in accordance with modulation information, capacity information, and resource scheduling information for multiple access that is provided through power modulation division communication; receive information, from the base station in a UE-specific control channel in accordance with resource assignment information for multiple access that is provided through power modulation division communication; and configure the receiver to independently decode user data for the UE based on the received information.

17. The UE of claim 16,
wherein the processor is further configured to receive information in the common control channel in accordance with UE pairing information.

18. A method for multiple access based on power modulation division communication comprising:
receiving information, at User Equipment (UE), from a base station in a common control channel in accordance with modulation information, capacity information, and resource scheduling information for multiple access that is provided through power modulation division communication;
receiving information, at the UE, from the base station in a UE-specific control channel in accordance with resource assignment information for multiple access that is provided through power modulation division communication; and
configuring a receiver at the UE to independently decode user data for the UE based on the received information.

19. The method of claim 18, further comprising:
receiving information in the common control channel in accordance with UE pairing information.

20. A communication system for multiple access based on power modulation division communication comprising:
a plurality of base stations;
a plurality of User Equipment devices (UEs),
the plurality of base stations including a base station comprising:
a transmitter configured to transmit transmissions;
a controller, coupled to the transmitter, the controller comprising a processor to: determine modulation information, capacity information, resource scheduling information, and resource assignment information for multiple access that is provided through power modulation division communication for UEs; provide information to the transmitter for transmission through a communication interface in a common control channel in accordance with the determined modulation information, capacity information and resource scheduling information to the UEs; and provide information to the transmitter for transmission through the communication interface to a UE in a UE-specific control channel in accordance with the determined resource assignment information,
the plurality of UEs including at least one UE comprising:
a receiver, comprising a processor to: receive information, from the base station in the common control channel in accordance with the modulation information, capacity information, and resource scheduling information; receive information, from the base station in the UE-specific control channel in accordance with the resource assignment information; and
configure the receiver to independently decode user data for the UE based on the received information.

21. A method for multiple access based on power modulation division communication comprising:
determining, at a base station in a communication system, modulation information, capacity information, resource scheduling information, and resource assignment information for multiple access that is provided through power modulation division communication for a plurality of User Equipment devices (UEs) in the communication system;

transmitting information to the plurality of UEs in a common control channel in accordance with the determined modulation information, capacity information and resource scheduling information;

transmitting information to a UE of the plurality of UEs in a UE-specific control channel in accordance with the determined resource assignment information;

receiving, at the UEs, the information in the common control channel;

receiving, at the at least one UE, the information in the UE-specific control channel;

configuring a receiver at the at least one UE to independently decode user data for the UE based on the received information.

22. A non-transitory processor-readable medium storing instructions that enable a processor to perform a method for multiple access based on power modulation division communication, the method comprising:

determining, at a base station, modulation information, capacity information, resource scheduling information, and resource assignment information for multiple access that is provided through power modulation division communication for a plurality of User Equipment devices (UEs);

transmitting information to the plurality of UEs in a common control channel in accordance with the determined modulation information, capacity information and resource scheduling information;

transmitting information to a UE of the plurality of UEs in a UE-specific control channel in accordance with the determined resource assignment information.

23. A non-transitory processor-readable medium storing instructions that enable a processor to perform a method for multiple access based on power modulation division communication, the method comprising:

receiving information, at User Equipment (UE), from a base station in a common control channel in accordance with modulation information, capacity information, and resource scheduling information for multiple access that is provided through power modulation division communication;

receiving information, at the UE, from the base station in a UE-specific control channel in accordance with resource assignment information for multiple access that is provided through power modulation division communication; and configuring a receiver at the UE to independently decode user data for the UE based on the received information.

* * * * *